(12) United States Patent
Broemmelsiek et al.

(10) Patent No.: US 7,042,494 B2
(45) Date of Patent: May 9, 2006

(54) WIRE HARNESS APPARATUS FOR MULTI-NODE VIDEO CAMERA ARRAY

(75) Inventors: Raymond M. Broemmelsiek, San Diego, CA (US); Chris H. Pedersen, Jr., Santee, CA (US); Charles Wilson, Santee, CA (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 698 days.

(21) Appl. No.: 09/925,222

(22) Filed: Aug. 8, 2001

(65) Prior Publication Data

US 2003/0030725 A1    Feb. 13, 2003

(51) Int. Cl.
*H04N 7/18*    (2006.01)
(52) U.S. Cl. ............... 348/159; 348/143; 348/151; 348/152; 348/153
(58) Field of Classification Search ........... 348/143, 348/151, 152, 153, 159
See application file for complete search history.

(56) References Cited

U.S. PATENT DOCUMENTS 6,049,353 A * 4/2000 Gray ..................... 348/159
6,215,518 B1   4/2001 Watkins ................ 348/148

* cited by examiner

*Primary Examiner*—Allen Wong

(57) ABSTRACT

A wire harness apparatus for remotely accessing and controlling a number of synchronized low-cost camera nodes sharing a single cable is provided. The invention converts power, control, and video signals where necessary for long distance remote access including conversion between single-ended and differential signals. Frame synchronization is provided for multiple externally synchronizable camera nodes. A method is provided to generate address data for selection of individual uniquely addressable camera nodes. And, a method to modify the video signal driven from a camera node onto the wire harness apparatus with a code that uniquely identifies that particular camera node. The invention extends the usable range of control while maintaining the cost savings associated with the camera nodes' wiring and installation.

7 Claims, 5 Drawing Sheets

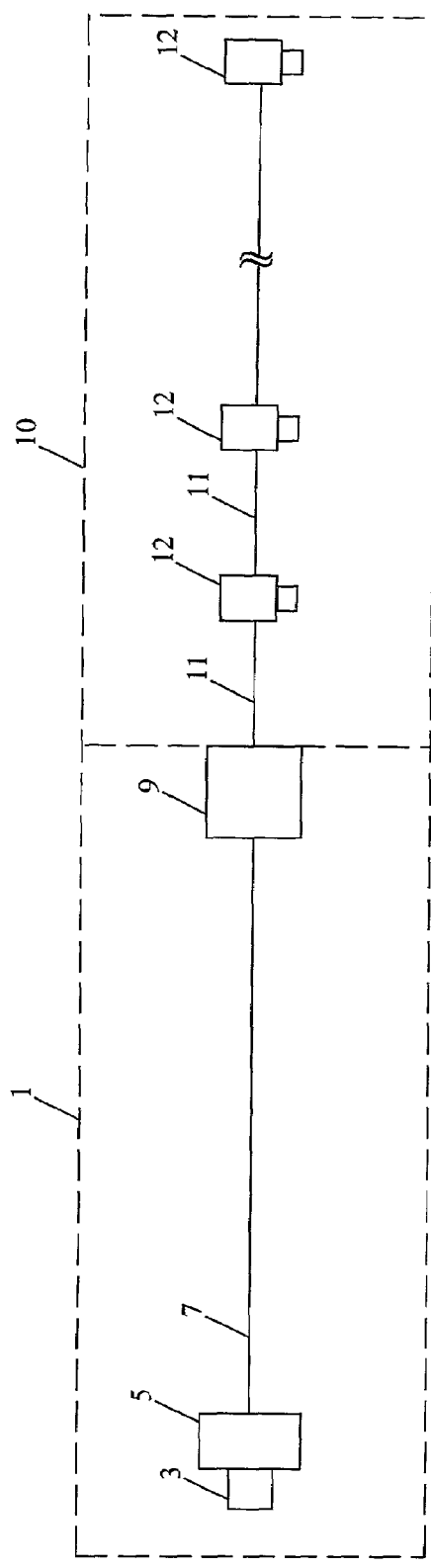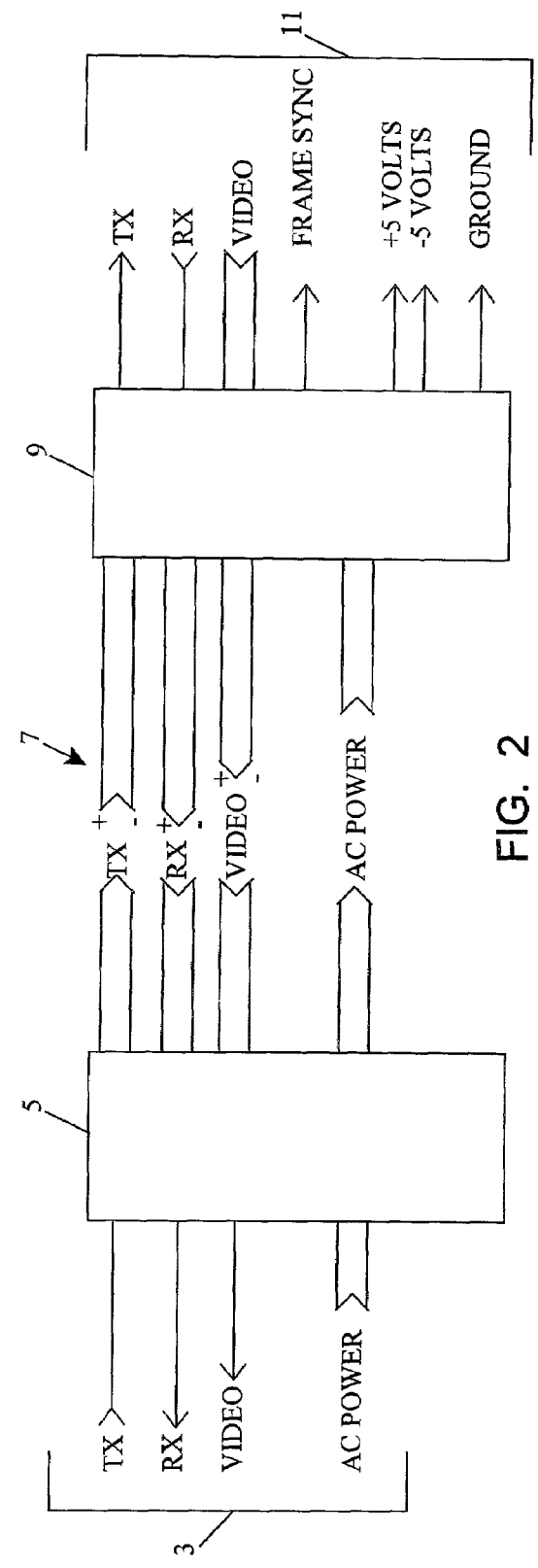
FIG. 1
FIG. 2

WIRE HARNESS APPARATUS FOR MULTI-NODE VIDEO CAMERA ARRAY

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to video surveillance systems and more particularly to video surveillance systems using motion video camera arrays on a single wire harness.

2. Description of the Related Art

There are several shortcomings in the current video surveillance systems that need to be overcome before complete video coverage becomes commonplace. Generally, installation and materials cost of individual video cameras is prohibitively high to permit complete video coverage of an installation or facility to be placed under surveillance. Motion video cameras used for video surveillance generally use CCD based technology, expensive lenses and enclosures. Therefore, in one solution, cameras are strategically mounted to cover thoroughfares and sensitive areas. In a retail store, for example, a fixed mount motion video camera may be placed over the main entrance, another strategically placed to cover the cash register and countertop, and another to cover expensive or easily concealed merchandise. These placements may be foiled because line-of-sight is not ideal for a particular event, or an irregular activity occurs elsewhere in the store where coverage does not exist.

In another solution, servo-controlled moveable cameras are used in which line-of-sight may be remotely altered by a human operator or tracking algorithm. Movable cameras have the ability to be steered and even zoomed into an area of interest. However, each movable camera is significantly more expensive than a number of fixed mount cameras, and generally requires a human operator.

In all of the present solutions, cabling costs for each camera typically requires a power cable as well as coaxial cable for the video signals. Servo-controlled moveable cameras also require cabling to support the remote camera control interface. The cabling and mounting costs may often exceed the unit cost of individual cameras.

In addition, when a number of cameras are placed, a device called a video multiplexer is typically added to the system to control and access the plurality of video signals. In current systems, a multiplexer provides cost saving benefits by allowing several cameras to share the same display and/or video recording device. However, the multiplexer does not reduce the number or cost of individual camera placements.

BRIEF SUMMARY OF THE INVENTION

A wire harness apparatus to remotely support a number of synchronized low-cost camera nodes to reduce cost associated with wiring, installation, cameras, video multiplexer and mounting is provided.

In a first aspect of the present invention, a wire harness apparatus supports remote access to an array of multiple camera nodes sharing a common set of conductors on a cable. A conductor that conducts power, video, and serial control signals extends access to the array. Connected to one end of the conductor is a remote signal converter for connection to a general-purpose remote interface to access and control camera node array. The remote signal converter provides conversion between single-ended signals at the general-purpose remote interface and differential signals on conductor. Connected to other end of conductor is a local signal converter for interface to camera node array that provides conversion between differential signals at conductor and single-ended signals at camera node array.

The wire harness apparatus provides frame synchronization for multiple externally synchronizable camera nodes. The local signal converter receives alternating current power input from the conductor. It then derives a frame synchronization signal from the power input for use by camera nodes. The local signal converter may also convert the alternating current power on the power conductor to provide power source for use by the camera nodes.

A second aspect of the invention provides a method for using the wire harness apparatus to generate address data for selection of individual uniquely addressable camera nodes. The address data constitute either a fixed pattern or selection of individual camera nodes based on activity sensed by each camera node.

In a third aspect of the invention, a method for using the wire harness apparatus to modify the video signal driven from a camera node onto the wire harness apparatus with a code that uniquely identifies that particular camera node. This modified video signal allows other devices that use the video signal to discern the source camera node of each video frame composing the video signal.

Objectives, advantages, and applications of the present invention will be made apparent by the following detailed description of embodiments of the invention.

BRIEF DESCRIPTION OF THE SEVERAL VIEWS OF THE DRAWINGS

FIG. 1 is a block diagram of the wire harness apparatus connected to an array of camera nodes.

FIG. 2 is a block diagram detailing the use of conductors within the cable of the wire harness apparatus of FIG. 1.

DETAILED DESCRIPTION OF THE INVENTION

Figure 3:
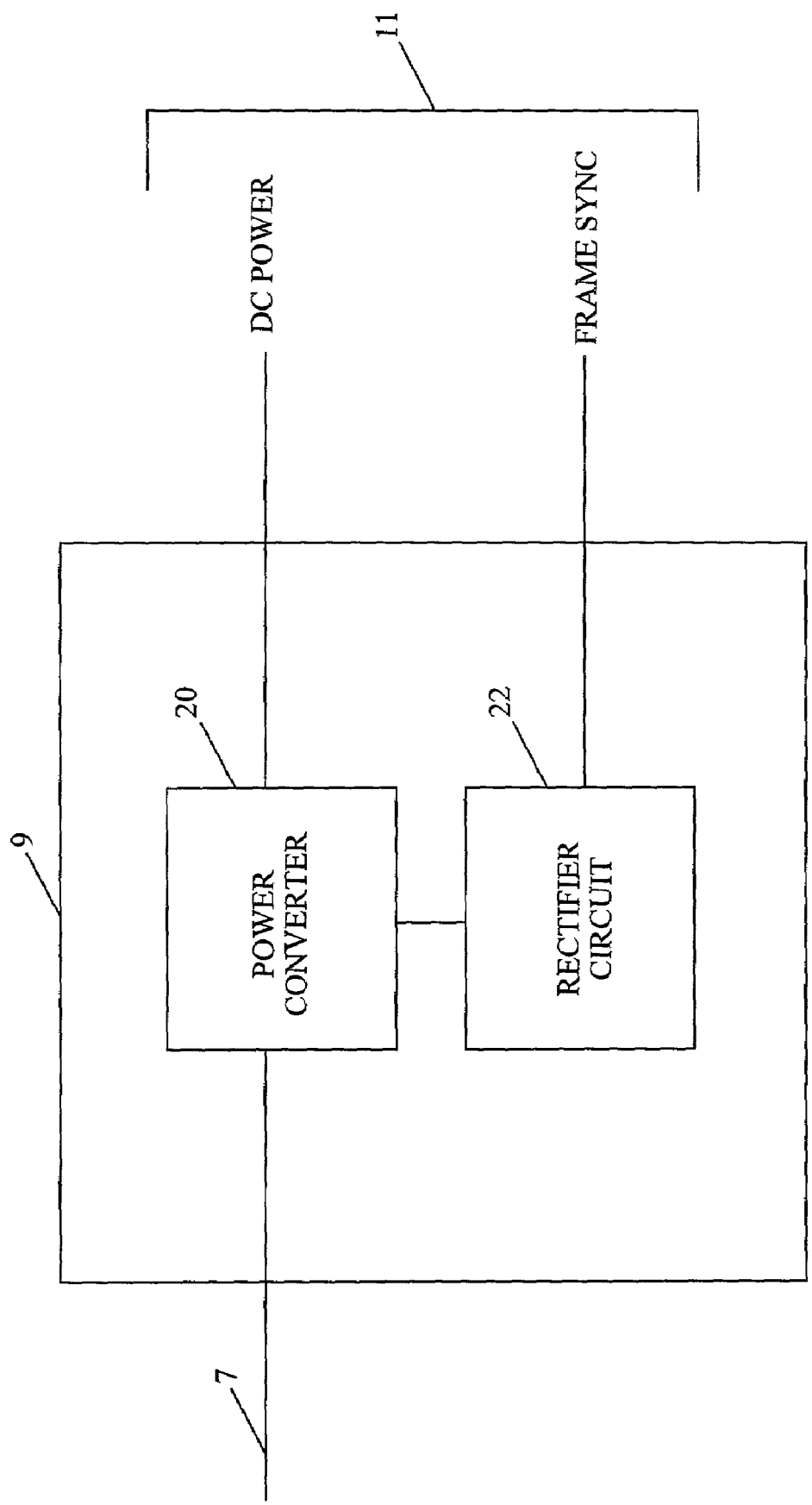
FIG. 3 is a block diagram of the power and frame sync generation parts within the local signal converter of the wire harness apparatus.

Referring to FIG. 1, the present invention extends the usable range of an array of camera nodes 10 using a wire harness apparatus 1. The array of camera nodes 10 consists of a plurality of individual, externally synchronizable camera nodes 12, each connected to a common cable 11. The wire harness apparatus 1 extends the usable range of the array of camera nodes 10 by providing signal conversion for transmitting over extension cable 7 as described hereinbelow. The local converter 9 connects on one side to the array of camera nodes 10 which has single-ended signals and on the other side to one end of the extension cable 7. The local converter 9 converts these single-ended signals to differential signals for use on the extension cable 7. The extension cable 7 carries the differential signals to and from its other end, which is connected to the remote converter 5. Similar to the local converter 9, the remote converter converts the differential signals from and to the extension cable 7 to single ended signals for use at the general-purpose remote interface 3. The general-purpose remote interface 3 may be connected to any device capable of using the video signal for display, recording, or the like. For camera selection and camera status polling, the general-purpose remote interface 3 may be connected to any device capable of transmitting and receiving a serial stream.

Referring now to FIG. 2, a detail of the signals at the general-purpose remote interface 3, the extension cable 7, and the common cable 11 is illustrated. Starting with the general-purpose remote interface 3, transmit and receive serial interfaces are provided. These interfaces may support the EIA RS-232C standard, or the like. Commands may be sent through the transmit serial interface for camera selection and to poll individual cameras for status. Status may then be received at the receive serial interface. The transmit and receive serial interfaces of the general-purpose remote interface 3 are converted to and from differential signals at the remote converter 5 where they are differentially sent and received at the extension cable 7. As is well-known in the art, differential signals exhibit a higher degree of immunity to noise and are therefore more suitable when driving over longer distances. At the local end of the extension cable 7, the differential signals are converted back once again to single-ended signals for use at the common cable 7. It should be apparent to one skilled in the art that differential signals on the extension cable 7 is one of many signal conditioning methods that can be employed for data transmission.

At any time, the common cable 11 has one and only one camera node 12 driving its video signal onto it. Starting at the video interface on the common cable 11, the video signal is converted by the local converter 9 to be driven down the extension cable 7. This video signal may be digital or analog. The video signal is then received at the remote converter 5 where it is then converted for use at the general-purpose interface 3.

Lastly, power may be supplied remotely at the general-purpose interface 3. In one embodiment, alternating current (AC) power is used. Power is passed through the remote converter directly to the extension cable 7 and then to the local converter 9 where it may be converted to preferred voltages before being driven onto the common cable 11. Alternatively, power may be supplied locally at the array of camera nodes 10. The recommended material for the extension cable 7 uses category '5' cable which is cost-effective, has adequately controlled impedance, and contains four twisted pairs of conductors.

Referring to FIG. 3, a second aspect of the invention is illustrated. The local converter 9 derives frame synchronization from the AC power, which is received from the extension cable 7. It is standard practice that AC power oscillates at or near to the frequency of the local television field rate. In the case of the North American television standard, NTSC, AC power cycles at 60 Hertz, which is nominally equivalent to the field rate. The local converter 9 receives the power input. The power converter 20 then converts the AC power to DC, which is driven onto the common cable 11. The power converter 20 drives the power phase to the rectifier circuit 22, which provides the frame sync signal to the common cable 11. Power converters and rectifier circuits are well-known in the art.

Figure 4:
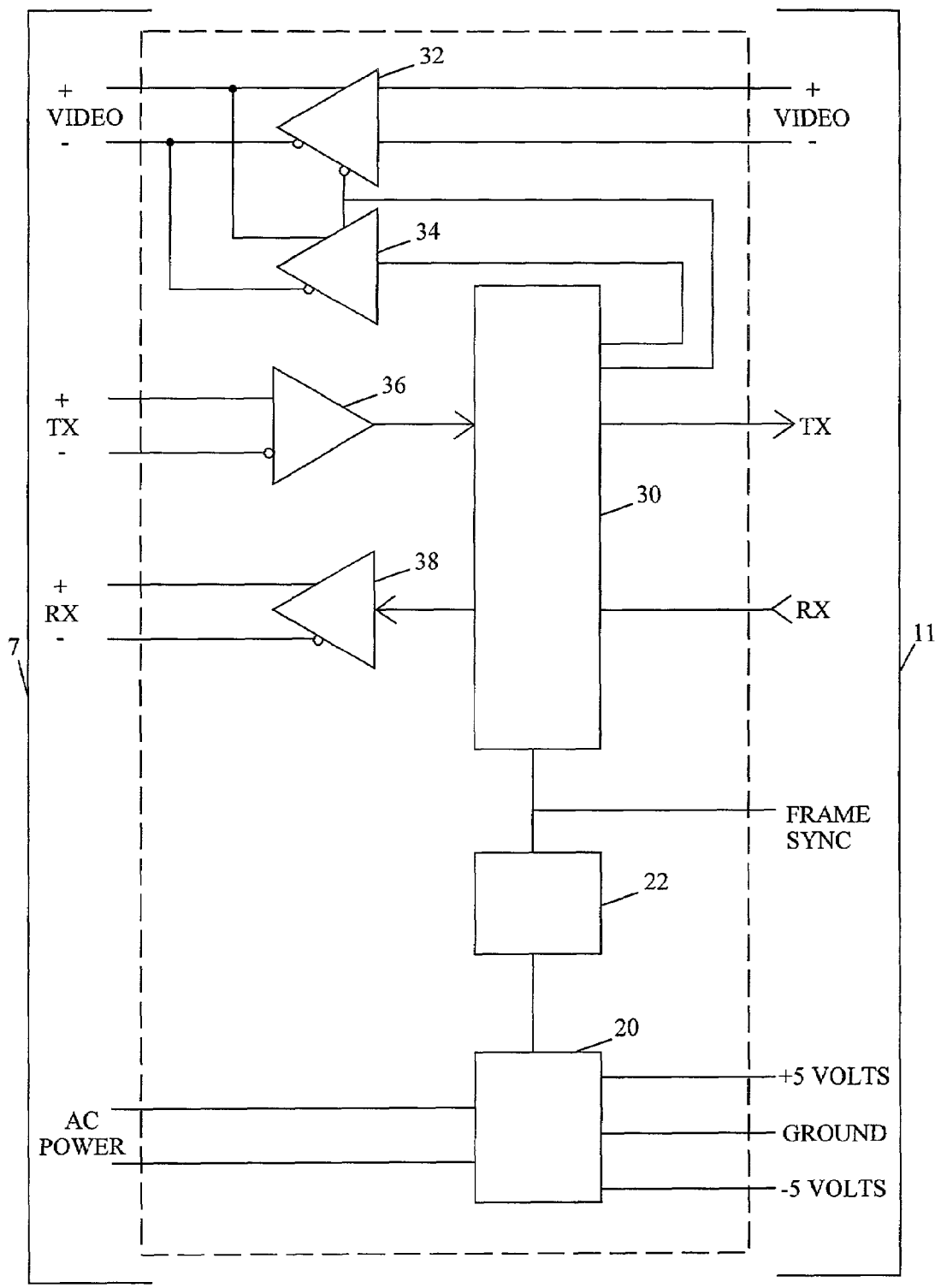
FIG. 4 is a block diagram of an embodiment of the local signal converter that supports node identification insertion onto the video signal.

Referring to FIG. 4, a detail of the preferred embodiment of the local converter 9 is illustrated. On one side of the local converter 9 is a segment of the extension cable 7. Video is sourced from either of two differential drivers 32 and 34. In one case, the video signal is received from the common cable 11. In the other, the video signal is received from the microprocessor 30. The microprocessor 30 provides the selection of the source as well as the data when differential driver 34 is selected. The content of the data will be detailed below in which the method for camera node identification insertion is described. Also from the extension cable 7 are the differential transmit and receive signals. Transmit is received by a differential receiver 36 and then by the microprocessor 30 where all remote commands may be decoded before being passed to the common conductor 30. Likewise, receive is sourced from the common conductor 11 and passed to the microprocessor 30 for decoding before being passed to the differential driver 38 for transmission to the extension cable 7.

As described above in FIG. 3, AC power, DC power and the frame sync signals are shown with their corresponding parts, the power converter 20 and the rectifier circuit 22. In addition, frame sync is input to microprocessor 30. The frame sync enables the microprocessor to switch the differential drivers 32 and 34 synchronous to the video signal. In addition, the frame sync input enables the microprocessor 30 to determine which camera node is currently sourcing the video from common cable 11 at any time. Details of these methods are described hereinbelow.

Figure 5:
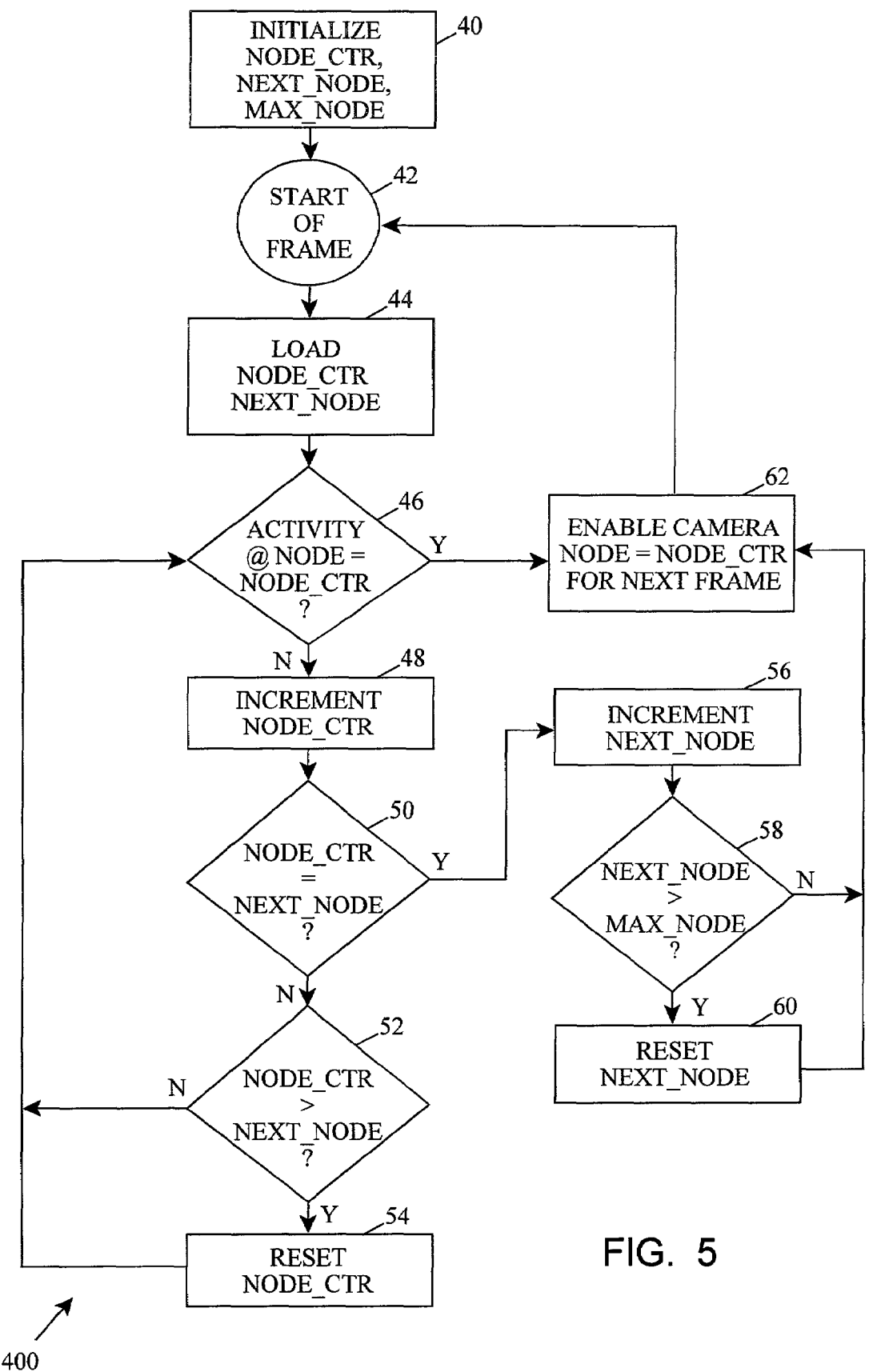
FIG. 5 is a flow chart illustrating a method of selecting camera nodes based on activity within a camera node's field of view.

Referring to FIG. 5, a method 400 for using the wire harness apparatus, which generates address data for selection of individual uniquely addressable camera nodes based on activity within each node's field of view, is shown. In one embodiment, the method is implemented as a program executed by microprocessor 30 within the local converter 9. The method 400 begins with the initialization of three registers node_ctr, next_node, and max_node at step 40. Each camera node 12 in the array of camera nodes 10 is uniquely addressable. The three registers maintain the addresses of the camera nodes 12 and for simplicity, it is assumed that adjacent nodes are addressed sequentially. The first register, node_ctr maintains the address of the current node that is being polled. The second register, next_node, maintains the value of the node to be actively driving video onto the common conductor 11 in the event that there is no activity within the field of view of any of the nodes. The third register, max_node, maintains a constant that represents the highest cardinal value node address. This node is used to determine when node_ctr and next_node have counted to the last camera node 11 in the array of camera nodes 10.

Next, the program is synchronized to the start of a new video frame at step 42. After initialization, the method 400 is carried out once every video frame period. The node_ctr register is then loaded with the value in next_node at step 44 and the corresponding camera node is polled for activity step 46. If there is activity, then that camera node is enabled for driving its video during the next video frame step 62 and the program loop is completed for that frame. If not, the node_ctr register is incremented step 48 so that the next camera node may be polled. If after being incremented, node_ctr is equal to next_node step 50, then this indicates that all camera nodes 12 have been polled and there is no activity on any camera node. Therefore, in this case next_node is incremented for the next video frame step 56, compared with max_node step 58 to insure that next_node has not exceeded its valid range. If so, next_node is reset step 60. In either case, the next_node value is used to enable the camera node 12 for the next video frame step 62 and the program loop is complete for the current video frame.

If node_ctr is not equal to next_node at step 52, then the value of next_node is compared to determine if it is greater than the value of max_node step 52 and thus requiring next_node to be reset to represent the value of the first node in the array of camera nodes 10 at step 54. In either case, the program then proceeds to step 46 once again to poll the next camera node 12 for activity.

Although method 400 takes advantage of enabling camera nodes 11 sequentially based on activity at each camera node 11, any sampling pattern might be implemented to enable the sequence of individual camera nodes 12 in an array of camera nodes 10.

Figure 6:
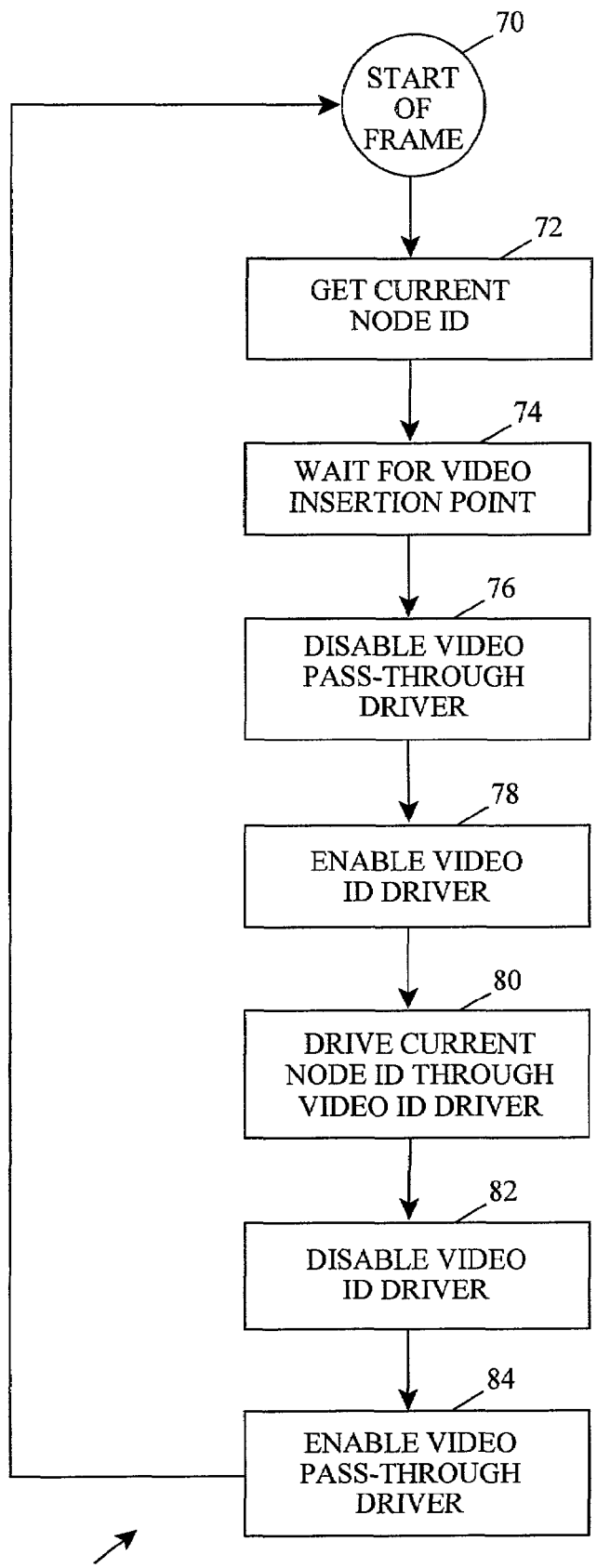
FIG. 6 is a flow chart illustrating a method by which node identification is inserted onto the video signal.

Referring to FIG. 6, a method 500 for using the wire harness apparatus, which modifies the video signal driven from a camera node with a code that uniquely identifies that camera node is illustrated. In one embodiment, the method is implemented as a program executed by the microprocessor 30 within the local converter 9.

The method 500 begins at the start of a video frame at step 70 and executes once for each successive video frame. In step 72, the identification of the current camera node 12 driving the common conductor 11 is received. Recall that each camera node 12 in the array of camera nodes 10 is uniquely addressable. In step 74, the program waits for the position or positions within the video frame in which the node identification may be inserted onto the video signal in a manner nondestructive to the video data. At that point, the differential drivers 32 and 34 are disabled and then enabled respectively in steps 76 and 78.

At step 80, the node identification for the current node camera 12 sourcing the video signal is driven into the video signal. Upon completion of this step, the differential drivers 34 and 32 are disabled and then enabled respectively in steps 82 and 84. This modified video signal allows other devices that use the video signal to discern the source camera node of each video frame composing the video signal. It should be apparent to one skilled in the art that current injection may also be employed to modify the video signal in a like manner.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A wire harness apparatus for remote use with a camera node array having a plurality of camera nodes sharing a common set of conductors on a cable, and which electrically converts signals from and to the camera node array over a relatively long cable length, comprising:

conductor means for carrying power, video, and control signals over a relatively long distance;

remote signal conversion means, connected to one end of said conductor means, for connection to a general-purpose remote interface to access and control the plurality of camera nodes, and for conversion between single-ended signals at said general purpose remote interface and differential signals on said conductor means; and, local signal conversion means, connected to the opposite end of said conductor means, for interface to said plurality of camera nodes for conversion between differential signals at said conductor means and single-ended signals at said camera node array;

wherein said remote signal conversion means converts a single-ended input transmit control signal to a differential output control signals, converts a differential input receive control signal to a single-ended output control signal, converts a differential input video signal to a single ended output video signal, and passes through alternating current power wherein each of said differential signals are connected to said conductor means and each of said single ended signals define said general purpose remote interface.

2. The wire harness apparatus according to claim 1 wherein said local signal conversion means receives alternating current power input from said conductor means and derives a frame synchronization signal for use by each of the camera nodes in the camera node array.

3. The wire harness apparatus according to claim 1 wherein said local signal conversion means receives alternating current power input from conductor means and converts the alternating current power on the power conductor to provide power for use by each of the camera nodes in the camera node array.

4. The wire harness apparatus according to claim 1 wherein:

said local signal conversion means for interface to said camera node array converts a differential input transmit control signal to a single-ended output control signal, converts a single-ended input receive control signal to a differential output control signal, converts a single-ended input video signal to a differential output video signal, receives alternating current power and derives a frame synchronization signal as an output and converts power for use by each of the camera nodes in the camera node array, wherein each of said differential signals are connected to said conductor means and each of said single ended signals are connected to the camera node array.

5. The wire harness apparatus according to claim 1 wherein the number of individual conductors used in said conductor means is the same number used by the camera node array.

6. The wire harness apparatus according to claim 1 wherein said local signal conversion means comprises processing means to poll individual camera nodes for activity within a field of view for each camera node and select a next camera node for display according to the activity.

7. The wire harness apparatus according to claim 1 wherein said local signal conversion means comprises processing means to select individual camera nodes according to a programmed pattern.

* * * * *